Oct. 28, 1930.  E. C. AUSTIN  1,779,459
BALL JOINT
Filed June 9, 1926
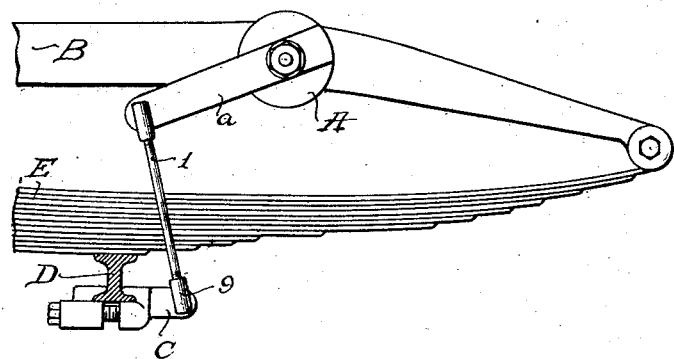
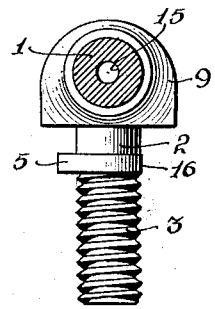
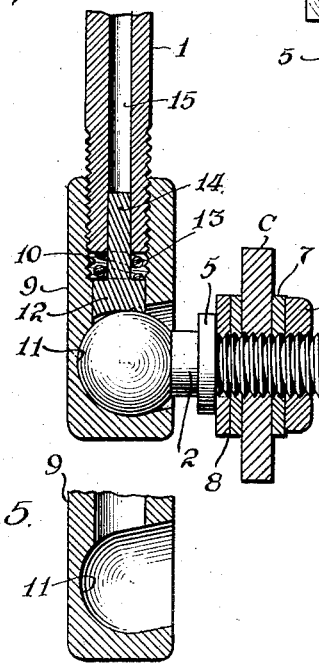
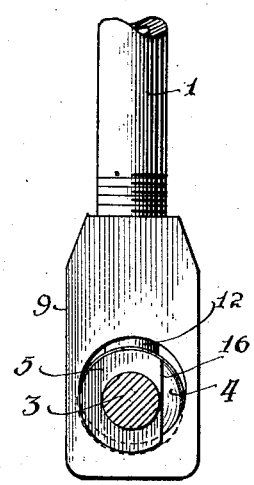
Inventor
Ernest Charles Austin,
By
Attorneys Patented Oct. 28, 1930

1,779,459

UNITED STATES PATENT OFFICE

ERNEST CHARLES AUSTIN, OF POUGHKEEPSIE, NEW YORK

BALL JOINT

Application filed June 9, 1926. Serial No. 114,699.

This invention relates to a device for connecting two members and permitting a limited universal movement of one member relative to the other. An object of the invention is to provide a device for the purpose which is simple in construction, cheap to manufacture and efficient in operation. A further object is to provide a device having a minimum number of parts so assembled as to obviate accidental disconnection of the members and constructed to automatically take up the wear and prevent looseness or rattling.

With the above and other ends in view, the invention consists in the matters hereinafter set forth and more particularly pointed out in the appended claims, reference being had to the accompanying drawing, in which Figure 1 is a side elevation of a device embodying the invention and illustrating an application thereof in use;

Figure 2 is a longitudinal section of the device;

Figure 3 is an end elevation of Figure 2;
Figure 4 is a side elevation of Figure 2; and Figure 5 is a sectional detail of the socket member.

The device embodying the present invention is adapted to connect two members and permit a limited relative universal movement of said members, and more particularly, to connect two members, one of which extends in a direction laterally of the other, as for instance in the illustrative installation shown in Figure 1 of the drawing wherein the device is shown as embodied in the connection between the operating arm a, a shock absorbing device A mounted upon the frame member B of a motor vehicle, and a rigid bracket or arm C secured to the vehicle axle D upon which axle the frame member B is supported in the usual manner by a spring E. It is necessary in such an installation, that a limited universal movement be provided for between the ends of the connecting rod 1 and the arms a and C as when the spring is flexed under load, the arm C not only approaches the arm a but due to the swaying of the car upon its spring supports, there will be a lateral movement of the arm a relative to the arm C.

To provide for this limited universal connection at the ends of the connecting rod 1, the universal joint connection illustrated in detail in Figures 2 to 5 inclusive, is provided, and this device comprises a fixed stud 2 having a screwthreaded shank portion 3, an integral ball head 4, and preferably, an integral collar or flange 5 adjacent the head. This stud is rigidly secured to one of the members between which said device is to form the connection, such as the arm C or the arm a, said arm being provided with an opening to receive the screwthreaded end of the stud to which end is applied a nut 6 with a lock washer 7 interposed between nut and arm and the nut turned up to force the arm into firm contact with the collar 5 or against washers or spacers 8 interposed between the arm and collar to properly space the arm from the ball 4. The end of the rod 1 is screwthreaded to receive a head 9 which is formed with a bore 10 extending inwardly from one end and internally screwthreaded to receive the end of the rod and a socket 11 is formed at the end of the bore to receive the ball head 4 on the stud 2. This socket 11 is formed by boring inwardly, laterally of the head 9 and at an angle to the longitudinal axis of the stud when said stud is in normal position with its longitudinal axis at right angles to the axis of the bore 10. The inner end of this socket 11 is preferably formed concentric to the axis of the ball 4, that is, it is formed with a radius equal to the radius of the ball and the outer open end of the socket is of a diameter equal to the diameter of the ball so that said ball head may be entered freely into said socket through this open outer end. To prevent the escape of said ball head from its socket, a plunger 12 is inserted in the bore 10 and provided with a curved end surface to rest upon the ball, a coiled spring 13 being interposed between a shoulder on the plunger and the inner end of the rod 1 to yieldingly hold the plunger firmly pressed against the head 4, and to guide the plunger in its movement, said plunger is formed with a stem 14 slidable in a bore 15 of the rod. The ball-head 4 is therefore firmly held seated in the lower end of its socket 11 by the plunger, and as the normal position of the stud is with its longitudinal axis at right angles to the axis of the bore 10 in which the plunger works, and as the axis of the entrance to the socket is at an angle to said axis of said stud, the ball head is held against escape from the socket by being pressed to its seat laterally of the socket entrance, but is free at all times to move within the socket in any direction.

A simple construction of universal joint connection having a minimum of parts and which is efficient in operation is thus provided, and one which may be quickly and easily assembled or disassembled, it being only necessary in assembly, to insert the ball head of the stud within its socket before screwing the socket head upon the end of the rod 1, and then secure the stud to the arm by inserting the stud in the hole in the arm and applying the nut to firmly secure the stud in place. Too free a movement of the ball in its socket and consequent looseness and rattling as the parts become worn, may be prevented by an adjustment of the head 9 on the rod, a screwing of the head into the rod, increasing the compression of the spring 13 to increase the frictional contact of the plunger with the ball head. To facilitate holding the stud against turning while the nut 6 is being turned up, the collar 5 may be flattened as at 16 for the application of a wrench thereto, and such other changes may be made in the construction and arrangement of parts, as fall within the scope of the appended claim.

Having thus fully described the invention, what I claim is:—

In a device for connecting two members and permitting relative limited universal movement of said members, a ball member on one of said members to be connected, and a socket member on the other of said members to be connected, said socket member having a closed end and a longitudinal bore extending inwardly from the opposite end of said member and having a lateral bore extending inwardly from one side of said member and inclined to the axis of said longitudinal bore, inwardly toward said closed end, said lateral bore being of a diameter equal to the diameter of said ball and terminating in a seat for said ball, said longitudinal bore opening into said lateral bore, and means in said longitudinal bore for engaging said ball and forcing the same to its seat laterally of said lateral bore.

In testimony whereof I affix my signature.

ERNEST CHARLES AUSTIN.